ABSTRACT OF THE DISCLOSURE

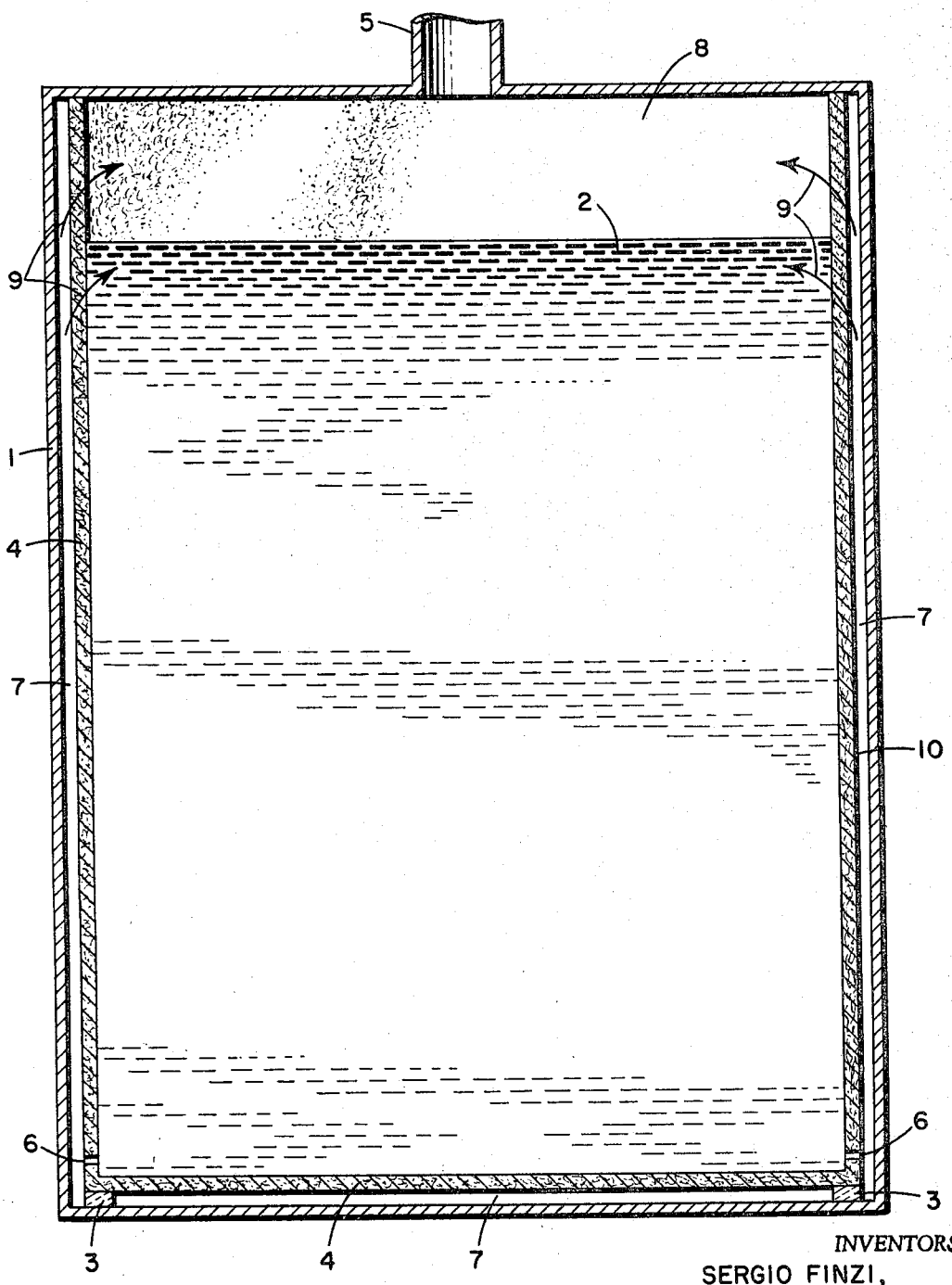
June 25, 1968     S. FINZI ET AL     3,389,823
CONTAINER FOR THE STORAGE AND/OR TRANSPORTATION
OF LIQUEFIED GASES
Filed June 3, 1966
INVENTORS
SERGIO FINZI,
JACQUES FAURE,
JEAN LEBRUN
BY *Stevens, Davis, Miller & Mosher*
ATTORNEYS 3,389,823
CONTAINER FOR THE STORAGE AND/OR
TRANSPORTATION OF LIQUEFIED GASES
Sergio Finzi, Masnago, and Jacques F. Faure and Jean P. Lebrun, Cocquio, Italy, assignors to European Atomic Energy Community (Euratom), Brussels, Belgium
Filed June 3, 1966, Ser. No. 555,194
Claims priority, application Belgium, June 16, 1965, 14,212, Patent 665,554
4 Claims. (Cl. 220—9)

A container for storage and/or transportation of liquefied gases including, outer impervious walls, thermally insulating walls formed of a porous casing disposed between the main body of the liquefied gas and the outer walls and spaced a few millimeters from said outer walls so as to bound a layer of the liquid therebetween.

---

The invention relates to thermally insulated containers for the storage and/or transportation of liquefied gases at very low temperatures.

The gases contained in liquid form in containers are at temperatures which may be very low depending upon the types of gas. At such temperatures the metal walls of the containers are very fragile and brittle. The containers used heretofore are Dewar flasks, which are very expensive to make and are also very fragile.

The thermal insulation according to the invention is obtained by means of a porous casing disposed between the liquid and the walls of the container, the casing being spaced a few millimeters from the walls so as to bound a layer of vapor of the said liquid.

The invention will be more readily understood from the accompanying drawing which is a vertical section through a container, for the walls of which a thermal insulation according to the invention has been used.

This single figure shows a container whose outside walls 1 are required to be provided with an effective thermal insulation to contain a liquid gas 2 at low temperature. The liquid is necessarily surmounted by a layer of gas 8. The wall 1 of the container is formed with an aperture 5 for the introduction or withdrawal of the liquid.

A casing 4 made of a woven fabric or a porous felt is disposed a few millimeters away from the wall 1 and is supported in the periphery of its base by a number of blocks 3 of insulating material. The casing 4 and the wall 1 bound a space 7 which as will be explained hereinafter performs a considerable role in the insulation. The casing 4 can be, but need not necessarily be, formed with apertures or slots, e.g. 6, preferably at the bottom of the casing, so that the space 7 can communicate with the liquid 2. These slots 6 should all be at the same level, as will be explained hereinafter.

When the cold liquid 2 is introduced via the aperture 5 into the container, some of it spreads to the space 7 through the pores of the casing 4 and/or the slots 6. Since the wall 1 is at ambient temperature, the liquid in the space 7 will very rapidly vaporize and will form a stagnant layer of gas which acts as an excellent thermal insulation. Measurements have shown that the temperature in the space 7 decreases from ambient temperature at the level of the wall 1 to the gas liquefaction temperature at the level of the outer wall of the casing 4. The temperature then drops ten or more degrees K. in the thickness of the casing 4 which contains practically only liquid droplets imprisoned in the fine pores of the casing, the vapor being practically only on the outer surface thereof. This temperature drop in the thickness of the casing is sufficient to prevent any boiling from occurring with resulting undesirable heat losses.

The few millimeters width of the space 7 (from the wall 1 to the casing 4) is sufficient for the layer of gas imprisoned therein to act effectively as a thermal insulation and is sufficiently small to prevent any convection movements of the insulating gas, which would be accompanied by a considerable heat loss.

The pressure of the insulating gas inside the space 7 is practically the same as that of the container at the aperture. The pressure on the porous fabric from outside to inside, at the level of the apertures 6, is a few centimeters of water at maximum. To enable a porous fabric of low mechanical strength to be used (i.e. one which is fine and light), it is preferable to form slots 6 in the bottom of the casing 4. The insulating space will then be at a slight positive pressure with respect to the container containing the liquid 2 and the casing will not tend to be crushed on the wall 1 with resulting increased heat losses.

Under the effect of its pressure (the hydrostatic counter-pressure of the liquid 2 and of the gas 8 above it being lower in the top of the container), the insulating gas in the space 7 may tend to pass through the porous casing in the upward direction (see arrows 9). To replace this gas which is lost in this way, an identical amount of liquid 2 would be vaporized through the pores of the liquid 2 and the slots 6. A convection flow would then occur through the non-horizontal parts of the casing 4 with resulting heat loss. To prevent such flow from occurring, the outside 10 (vapor side) of the casing 4 may, simply, be covered with a thin layer of an impervious material (of a thickness which may be 1/100 mm. or less). The only object of this is to seal the outer surface of the porous casing 4. Thus it is possible to use a sheet of metallic paper or the like (for example plastic), or spray the material with a gun without regard to its own mechanical properties, since the forces it has to undergo are negligible. The thin impervious coating may of course also be applied to the horizontal parts of the casing 4, but this is not essential.

A convection flow of gas may also occur between slots situated at different levels. To obviate this disadvantage, it is only necessary to dispose all the slots at the same level.

The thermal insulation as hereinbefore described has considerable advantages, inter alia: efficacy, light weight, low cost price, inter alia for production of the casing 4, which can be made to relatively wide tolerances since the cushion of gas imprisoned in the space 7 holds the flexible casing in place.

Of course a rigid porous casing could be used but this means a loss of the advantages of light weight and location of the casing by the vapor cushion.

The invention is in no way limited to the exemplified embodiment described hereinbefore. For example, the container may have any shape, for example be spherical.

We claim:
1. A container for the storage and/or transportation of liquefied gases, comprising an outer container, a thermal insulation comprising a porous casing disposed within the walls of said outer container, said porous casing being spaced a few millimeters from such walls so as to bound a layer of vapor of the said liquefied gas.

2. A container according to claim 1, further comprising a thin impervious coating applied at least to the non-horizontal surfaces of the casing on the side where the latter is in contact with the vapor.

3. A container according to claim 1 in which the porous casing is formed with slots, situated at the same level and providing communication between the liquid and its vapor.

4. A container according to claim 3 in which said slots are formed at the base of said casing.

References Cited

UNITED STATES PATENTS

| 673,073 | 4/1901 | Bobrick | 220—9 |
| 2,676,773 | 4/1954 | Sanz et al. | 220—9 |
| 2,927,712 | 3/1960 | Armato et al. | |
| 2,937,780 | 5/1960 | Beckwith | 220—9 |
| 2,994,452 | 8/1961 | Morrison | 220—9 |
| 3,019,937 | 2/1962 | Morrison | 220—9 |

FOREIGN PATENTS 842,719   7/1960   Great Britain.

THERON E. CONDON, *Primary Examiner.*

J. R. GARRETT, *Assistant Examiner.*